United States Patent [19]
Boelle

[11] Patent Number: 6,028,821
[45] Date of Patent: Feb. 22, 2000

[54] PROCESS FOR SEPARATING WAVES IN BOREHOLE SEISMICS FOR WALKWAY-TYPE ACQUISITIONS

[75] Inventor: Jean-Luc Boelle, Lescar, France

[73] Assignee: Elf Exploration Production, France

[21] Appl. No.: 09/168,228

[22] Filed: Oct. 7, 1998

[30] Foreign Application Priority Data

Oct. 9, 1997 [FR] France .................................. 97 12622

[51] Int. Cl.[7] .................................................. G01V 1/36
[52] U.S. Cl. .................................. 367/40; 367/63; 367/75
[58] Field of Search .................................. 367/57, 73, 63, 367/75, 40, 31; 364/421

[56] References Cited

U.S. PATENT DOCUMENTS

| | | | |
|---|---|---|---|
| 4,604,734 | 8/1986 | Ruehle ....................................... | 367/63 |
| 4,635,238 | 1/1987 | Gallagher et al. ......................... | 367/40 |
| 4,779,238 | 10/1988 | Howard .................................... | 367/63 |
| 5,142,501 | 8/1992 | Winterstein .............................. | 367/75 |

FOREIGN PATENT DOCUMENTS 0053525  6/1982  European Pat. Off. .

OTHER PUBLICATIONS

C. Esmersoy, "Inversion of P and SV Waves From Multicomponent Offset Vertical Seismic Profiles", Geophysics, vol. 55, No. 1, Jan. 1990, pp. 39–50.

B. Seeman et al, "Vertical Seismic Profiling: Separation of Upgoing and Downgoing Acoustic Waves in A Stratified Medium", Geophysics, vol. 48, No. 5, May 1983, pp. 555–568.

J.L. Mari et al, "Trace Pair Filtering for Separation of Upgoing and Downgoing Waves in Vertical Seismic Profile", Revue de l'Institut Francais du Petrol, vol. 45, No. 2, Mar./Apr. 1990, pp. 181–203.

R. Daures et al, "Applying Three–Componet Records in Wave Field Separation", Geophysical Transactions, Hungary, Jul. 1987, vol. 33, No. 1.

*Primary Examiner*—Christine K. Oda
*Assistant Examiner*—Anthony Jolly
*Attorney, Agent, or Firm*—Ostrolenk, Faber, Gerb & Soffen, LLP

[57] ABSTRACT

A process for separating waves in borehole seismics for walkaway-type acquisitions. Waves are generated in a medium from several positions of a source. The waves are received at at least three sensors along axes V, $H_1$, $H_2$. Collections of C traces are formed with a common source. On the basis of the trace collection, collections of residual C traces and C signals, a pivot trace is selected from the collection of residual C traces. A straight line of variable slope p is plotted at each sampled point of the pivot trace. The amplitudes of the seismic events located at the intersections of the traces with the straight line are summed along the straight line. The amplitude sums are then transferred to a domain $(\tau, p)$. A synthetic seismogram is made from the domain $(\tau, p)$ and iterations are performed until the synthetic seismogram is acceptable in terms of the data of the collection of residual C traces.

12 Claims, 8 Drawing Sheets

PROCESS FOR SEPARATING WAVES IN BOREHOLE SEISMICS FOR WALKWAY-TYPE ACQUISITIONS

BACKGROUND OF THE INVENTION

The present invention relates to a method for separating elastic waves that are received and recorded after they have propagated through a medium and, more particularly, for processing those signals recorded during an acquisition carried out by elastic-wave shots from several positions of one or more sources that are arranged at the surface of the medium. Throughout the entire shot sequence, the receiver or receivers are fixed in a borehole drilled in said medium. Subsequently, the receiver or receivers are moved to another position in the borehole for a different shot sequence. This type of acquisition is customarily referred to as "walkaway", that is to say, the shots are made with an offset increasing from one shot to the next.

In borehole seismic surveying on land and/or at sea, use is made of several sources that are separated by an optionally constant distance and are arranged along an acquisition line at the surface of the medium to be explored. A reception tool is lowered into the borehole, the direction of which may be vertical or deviated. The tool generally comprises several receivers which are separated by an optionally constant distance that is generally different than the optionally constant distance separating two consecutive sources. Each receiver comprises three sensors, or geophones, which are oriented in three different directions that are generally orthogonal, one of the directions being specified so as to provide a reference axis. The reference axis may be non-vertical or vertical if these sensors are mounted on a universal joint system. In either case, the reference axis V of the sensors is perpendicular to the plane defined by the other two directions $H_1$ and $H_2$, the positions of which are not generally known. The axes V, $H_1$, $H_2$ constitute a first system of axes.

The signals representing waves propagating in the medium are recorded as a function of time in the form of traces. The waves propagating through the medium are principally the upgoing or downgoing P-waves (direct waves) and the S-waves.

The traces recorded along the axes V, $H_1$, $H_2$ can be grouped as collections of traces with common emitter, for example.

One current way of processing the traces consists in defining a second system of axes R, N, T, in which the axis R is located in the maximum-energy plane. A transformation of this type is performed using what is customarily referred to as a double rotation, one rotation through an angle $\Phi_H$ being performed about the axis V, and the second rotation through an angle $\Phi_V$ being performed about a direction termed $H_{min}$, which is perpendicular to a vector $H_{max}$ that is the projection of the downgoing direct wave into the plane defined by $H_1$ and $H_2$, the angle $\Phi_H$ being the angle formed between $H_1$ and $H_{max}$.

The angle $\Phi_V$ is the angle formed by the axes V and R. This transformation of the first system of axes V, $H_1$, $H_2$ into a second system of axes R, N, T is carried out, in particular, using software, well-known to those skilled in the art, named SEISLINK which is marketed by the company WESTERN.

It is possible to produce traces in the system of axes R, N, T by projecting the components of the traces identified along the axes V, $H_1$, $H_2$, and to form collections of traces with common source identified as a function of the depth z and time t, on the basis of at least the traces along the axis R (or R traces).

The collections of traces, for example V, R or N collections, are then processed to separate the various types of waves, especially the downgoing and upgoing P-waves and the upgoing and downgoing S-waves.

One technique for separating said waves can be implemented by using the SEPAR software from the Compagnie Générale de Géophysique (CGG). However, this requires knowledge of the apparent velocities of the types of waves in question. These apparent velocities are generally determined by manual picking from the recorded traces. The drawbacks of this technique reside in the inherent inaccuracy of manual picking, and sometimes the fact that it is impossible to ascertain the types of waves directly from the recorded traces. Further, the cost of the processing is high while giving not very accurate results.

Another technique, advocated by the company SCHLUMBERGER, consists in using software capable of analyzing the common-source trace collections and of deducing therefrom the apparent velocities of the waves to be separated, when they exist. One drawback of this technique resides in its instability and, above all, in the fact that the separation of the waves is not very efficient because of the small number of sensors used.

These wave separation techniques are described respectively in the following articles:

B. SEEMAN and L. HOROWICZ: "Vertical seismic profiling: Separation of upgoing and downgoing acoustic waves in a stratified medium", GEOPHYSICS, Vol. 48, No. 5 (May 1983), p. 555–568;

C. ESMERSOY: "Inversion of P and SV waves from multicomponent offset vertical seismic profiles", GEOPHYSICS, Vol. 55, No. 1, (January 1990), p. 39–50.

SUMMARY OF THE INVENTION

The present invention relates to a novel method of separating elastic waves, in which particular processing of the trace collections is employed which makes it possible to overcome the drawbacks of the prior art methods as briefly mentioned above.

The method according to the invention for separating waves propagating in a medium, is of the type comprising the steps of:

generating waves in the medium successively from several positions of at least one source which are located at the surface of said medium, receiving said waves at at least one receiver that can successively occupy at least two positions in a borehole drilled in the medium, each receiver comprising three sensors which are oriented in a first system of axes (V, $H_1$, $H_2$), one of said axes (V) being oriented in a specified direction, each sensor delivering a signal which is recorded as a function of time in the form of a trace which is identified by the positions of the source/receiver pair that produced said trace, forming collections of traces (C) with a common source (z, t) from at least one set of traces V, $H_1$, $H_2$, which method further comprises the steps of a) extracting the first C signal arrivals of at least one of the collections of C traces, b) on the basis of said C trace collection, making a collection of residual C traces in which each residual trace is the difference between the C trace and the C signal estimate, c) from the collection of residual C traces, selecting a pivot trace located at a depth z, d) plotting a straight line of variable slope p at each sampled point of the pivot trace, e) along said straight line, for each value of p, summing the amplitudes of the seismic events located at the intersections of the traces with said straight line, f) transferring the amplitude sums for the corresponding time and slope into a domain (τ, p) in which p represents the values of said slope, lying between two extreme limits, and τ represents time, g) making a synthetic seismogram on the basis of the data in the domain (τ, p), h) comparing the synthetic seismogram with the common-source collection of residual C traces, and i) performing iterations until the synthetic seismogram is acceptable in terms of the initial data of said common-source collection of the residual C traces.

According to one advantageous feature, the method further comprises the steps of:

for each pair of source/receiver positions, defining a second system of axes (R, N, T) which is calculated, by known means, from the components on the three axes V, $H_1$, $H_2$ of the displacement vector corresponding to the first arrival of the wave of interest and from the projection $H_{max}$ of said displacement vector into the plane $H_1$, $H_2$, the axis R being located in the plane V, $H_{max}$, the axis N being perpendicular to the axis R and located in the plane V, $H_{max}$ and the axis T being perpendicular to the plane R, N, producing traces in the system of axes R, N, T by projecting the components of the traces identified along the axes V, $H_1$, $H_2$, forming the collections of traces (C) with common source (z, t) from the R traces, extracting the first R signal arrivals of the R trace collection, on the basis of the R trace collection, making a collection of residual R traces in which each residual trace is the difference between the R trace and the R signal estimate, from the collection of residual R traces, selecting a pivot trace located at a depth z, performing steps d) to i) on the residual R traces.

According to another feature, the method further consists in:

defining a geographically fixed third system of axes (X, Y, Z), in the system of axes (X, Y, Z), determining the deviation (Ψ) and the azimuth (θ) of the borehole, aligning the axis V of the first system of axes (V, $H_1$, $H_2$) with the direction of the borehole, defining a vector $h_1$ which is perpendicular to the axes V and Z and is contained in the plane $H_1$, $H_2$, determining the angle δ between the vector $h_1$ and the axis $H_1$.

According to another feature, the residual C or R components, as well as the components $H_1$ and $H_2$ or N and T are projected into the fixed system (X, Y, Z) to form residual components $X_r$ and $Y_r$, $Z_r$ on the axes X, Y, Z, the decomposition (τ, p) being carried out on the basis of the trace components $X_r$ and $Y_r$, $Z_r$.

According to another feature, known means are used to calculate, for each source/receiver pair and in the domains (τ, p), a polarization angular attribute ζ and an azimuth angular attribute γ.

When the wave of interest is the P-wave, the polarization attribute ζ, the azimuth attribute γ, the angle of deviation ψ and the azimuth θ of the borehole, as well as the slope p, are used to calculate the velocity attribute $V_p$ of the P-waves in the medium.

From the polarization attribute ζ and velocity attribute $V_p$, the raypath parameter attribute $p_z$ relative to the axis Z is calculated for a seismic event corresponding to values τ and p in the domain (τ, p).

The attributes $p_z$ and $V_p$ may be used to make a selection (mute) of the events to be kept in the domain (τ, p), said events being, in particular, those connected with the upgoing P-waves.

BRIEF DESCRIPTION OF THE DRAWINGS

Other advantages and features will become more clearly apparent on reading the description of the method according to the invention, as well as from the appended drawings, in which.

DETAILED DESCRIPTION

Figure 1:
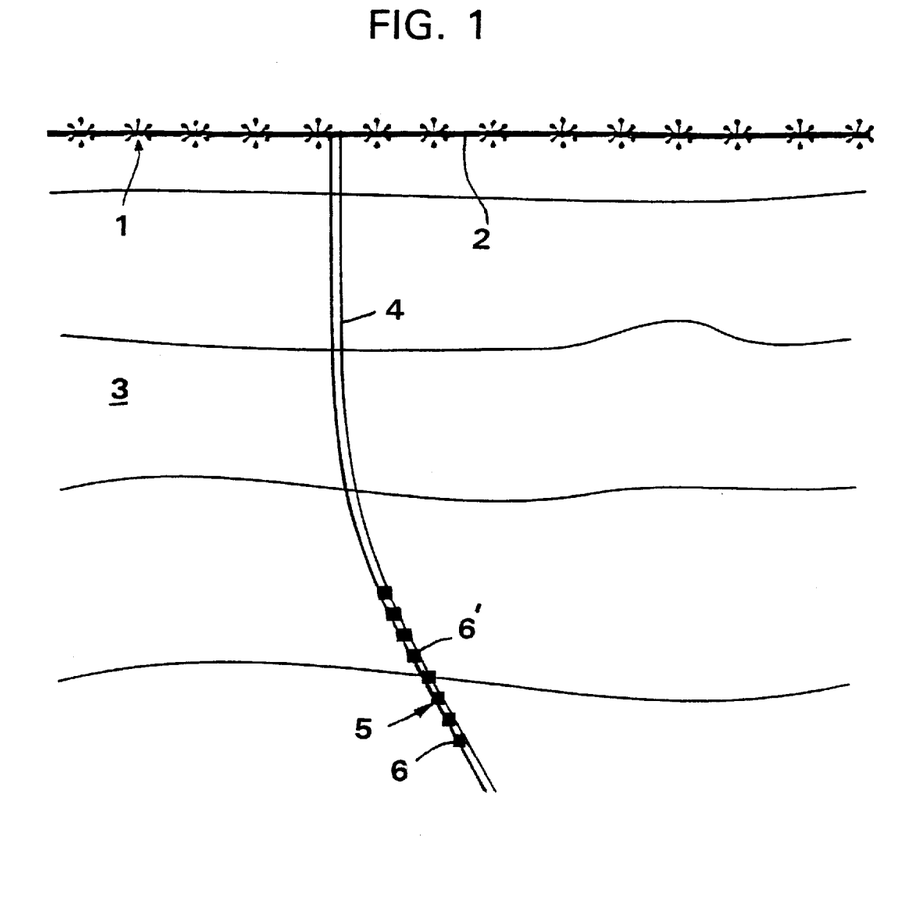
FIG. 1 is a schematic representation of the device for shooting and reception in a medium.
Figure 2:
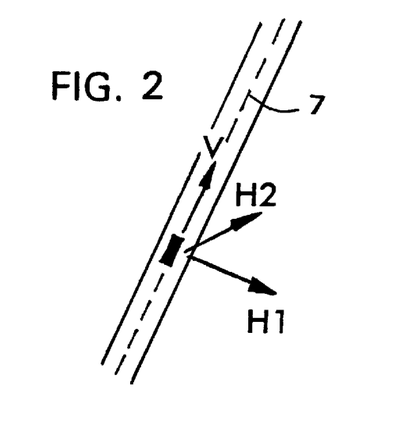
FIG. 2 is a schematic representation of the reception directions V, $H_1$, $H_2$ of the sensors of a receiver of the reception device.

According to the method of the present invention, one or more seismic sources 1 are used (FIG. 1) which are arranged on the surface 2 of a medium 3 in which a borehole 4 has been drilled. The borehole 4 may be vertical or deviated, as in FIG. 1. A reception device 5, which can occupy at least two positions in the borehole, is arranged in the deviated borehole 4. The reception device may comprise one or more receivers, for example four receivers 6, each consisting of three sensors whose directions lie along a right-angled system formed by three axes V, $H_1$, $H_2$, the axis V being directed along the axis 7 of the borehole 4, the other axes $H_1$ and $H_2$ being located in a plane perpendicular to the axis V (FIG. 2).

The distance separating two consecutive positions of the source 1 is generally constant and, for example, equal to 25 m, while the distance separating two consecutive receivers 6 is generally constant and, for example, equal to 10 m.

Figure 3:
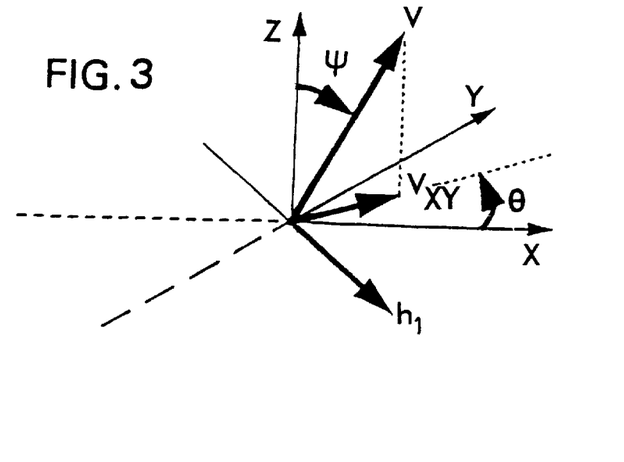
FIG. 3 is a schematic representation of the identification of the borehole of FIG. 1 in a geographically fixed system of axes X, Y, Z.

According to the present invention, the deviation $\Psi$ and the azimuth $\theta$ of the axis 7 of the borehole 4 is determined in a geographically fixed system of orthogonal axes X, Y, Z, the axis Z being vertical (FIG. 3). The coordinates of the vector V are given as a function of $\Psi$ and $\theta$ by the following formulae, in the system of axes X, Y, Z:

$$V \begin{Bmatrix} \cos\theta \sin\psi \\ \sin\theta \sin\psi \\ \cos\psi \end{Bmatrix}$$

the angles $\psi$ and $\theta$ lying respectively in the intervals $[0, \pi/2]$ and $[0, 2\pi]$.

A new vector $h_1$ is defined so as to be perpendicular both to the vector V and to the axis Z, its coordinates being given by the following formulae, in the system of axes X, Y, Z:

The vector $h_1$ is therefore $$h_1 \begin{Bmatrix} \sin\theta \\ -\cos\theta \\ 0 \end{Bmatrix}$$

contained in the plane $H_1$, $H_2$.

In the same way, a vector $h_2$ is defined which is located in the plane $H_1$, $H_2$ and is perpendicular to $h_1$. The coordinates of the vector $h_2$ in the system of axes X, Y, Z are given by the following formulae:

$$h_2 \begin{Bmatrix} \cos\psi & \cos\theta \\ \cos\psi & \sin\theta \\ -\sin\psi & \end{Bmatrix}$$

The positions of the axes $H_1$ and $H_2$, with respect to the vectors $h_1$ and $h_2$, are given by the following equations:

$$H_1 \begin{Bmatrix} \sin\theta & \cos\delta + \cos\psi\cos\theta\sin\delta \\ -\cos\theta & \cos\delta + \cos\psi\sin\theta\sin\delta \\ -\sin\psi & \sin\delta \end{Bmatrix}$$

and $$H_2 \begin{Bmatrix} -\sin\theta & \sin\delta + \cos\psi\cos\theta\cos\delta \\ \cos\theta & \sin\delta + \cos\psi\sin\theta\cos\delta \\ -\sin\psi & \cos\delta \end{Bmatrix}$$

Figure 4:
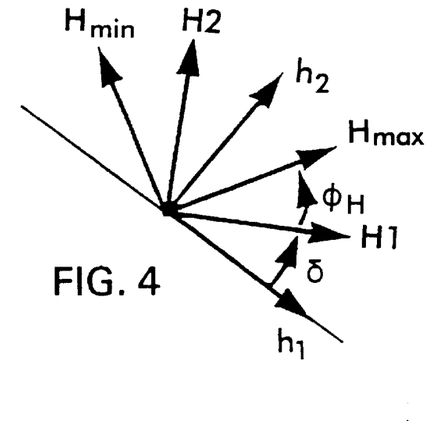
FIGS. 4 and 5 are representations of the angles $\Phi_H$ and $\Phi_V$ of rotation that are applied to the system V, $H_1$, $H_2$ for transformation into a system of axes R, N, T, FIG. 6 schematically represents collections of traces recorded at the receivers along the axes V, $H_1$, $H_2$.

In these formulae, $\delta$ represents the angle formed by the axis $H_1$ and the vector $h_1$ (FIG. 4).

The source 1 successively occupies several positions on the surface 2, said positions of the source 1 being located according to given geometrical configurations, rectangles or circles concentric around the drilled borehole 4.

The offset between the source 1 and the reception device 5 increases from one shot to the next, so that the acquisition performed is of the walkaway type. The source 1 generates elastic waves which propagate through the medium 3 and are received and recorded at each of the sensors of each receiver 6 of the reception device 5, the waves being recorded as a function of time t in the form of traces in the directions V, $H_1$ and $H_2$. Thus, for each shot, a set of traces is obtained and these traces are identified by the depth z of the receiver 6 and the position of the source 1. When the recording corresponding to a shot is completed, another shot is made for a different position of the source, and so on for all the predetermined positions of the shotpoints. After this, the reception device 5 is moved to a different depth in the borehole 4, as represented in FIG. 1, where the lower receiver 6 is moved to occupy the position 6'.

Another sequence of shots and recordings is then made for this different position of the reception device 5.

Each trace recorded on each sensor, that is to say in the directions V, $H_1$, $H_2$, is identified by the positions of the source 1/receiver 6 pair that produced said trace.

On the basis of at least one set of traces which are recorded in the directions V, $H_1$, $H_2$, collections of C traces with common source (z, t) are formed. The processing consists firstly in extracting the first C signal arrivals of at least one of the C trace collections and in making a collection of residual C traces from said collection of C traces, each residual trace being the difference between the C trace and the C signal estimate. A pivot trace, located at depth z, is selected from the collection of residual C traces, then a straight line with a slope p that is variable is plotted at each sampled point of the pivot trace. For each value of p, a sum is made of the amplitudes of the seismic events which are located at the intersections of the traces with said straight line. The amplitude sums for the corresponding time and slope are transferred to a domain $(\tau, p)$ in which $\tau$ is the time and p represents the values of said slope, varying between two extreme limits. On the basis of the data in the domain $(\tau, p)$, a synthetic seismogram is made. The synthetic seismogram is then compared with the common-source collection of residual C traces. Lastly, iterations are carried out until the synthetic seismogram is acceptable in terms of the initial data of the common-source collection of residual C traces.

In a preferred embodiment of the invention, the processing consists in defining, for each source/receiver position pair, a second system of orthogonal axes R, N, T which is calculated on the basis of the components along the three axes V, $H_1$, $H_2$ of the displacement vector corresponding to the first arrival of the wave of interest, for example the P-wave, and of the projection $H_{max}$ of the displacement vector into the plane $H_1$, $H_2$. The majority of the energy associated with the P-wave or direct wave of interest lies on this axis R, which corresponds to said displacement vector.

Figures 5, 10:
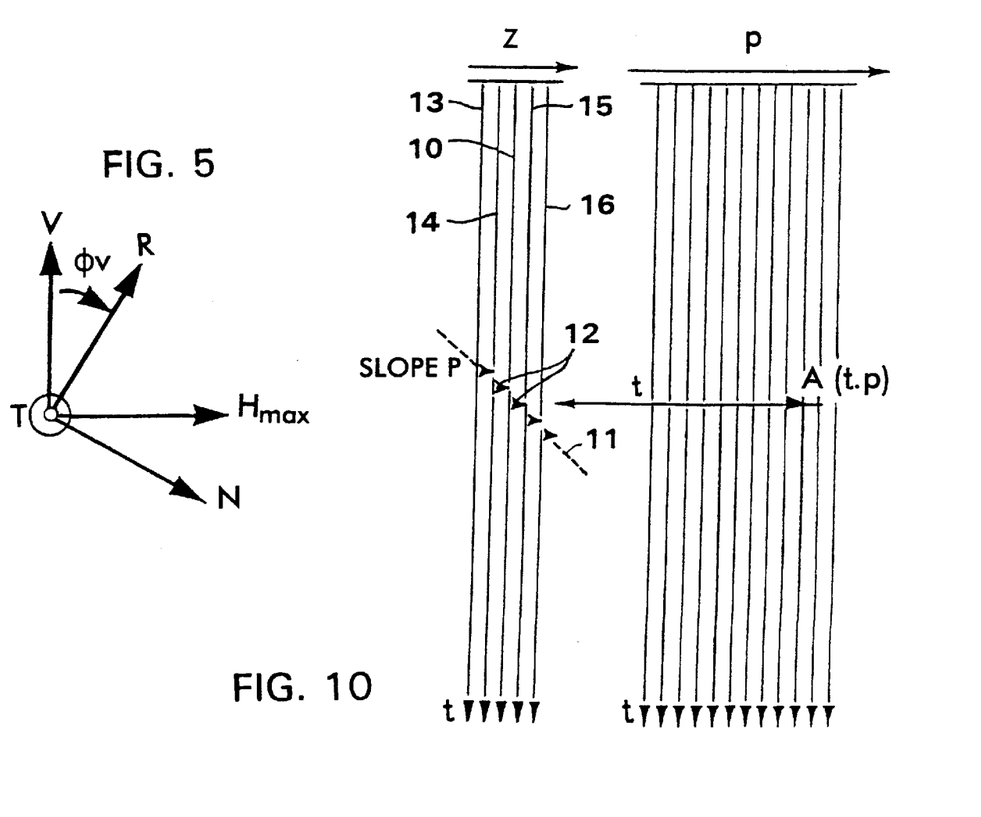
FIG. 10 is a schematic representation of the decomposition of a common-source trace collection (z, t) in a domain (τ, p)
Figure 6:
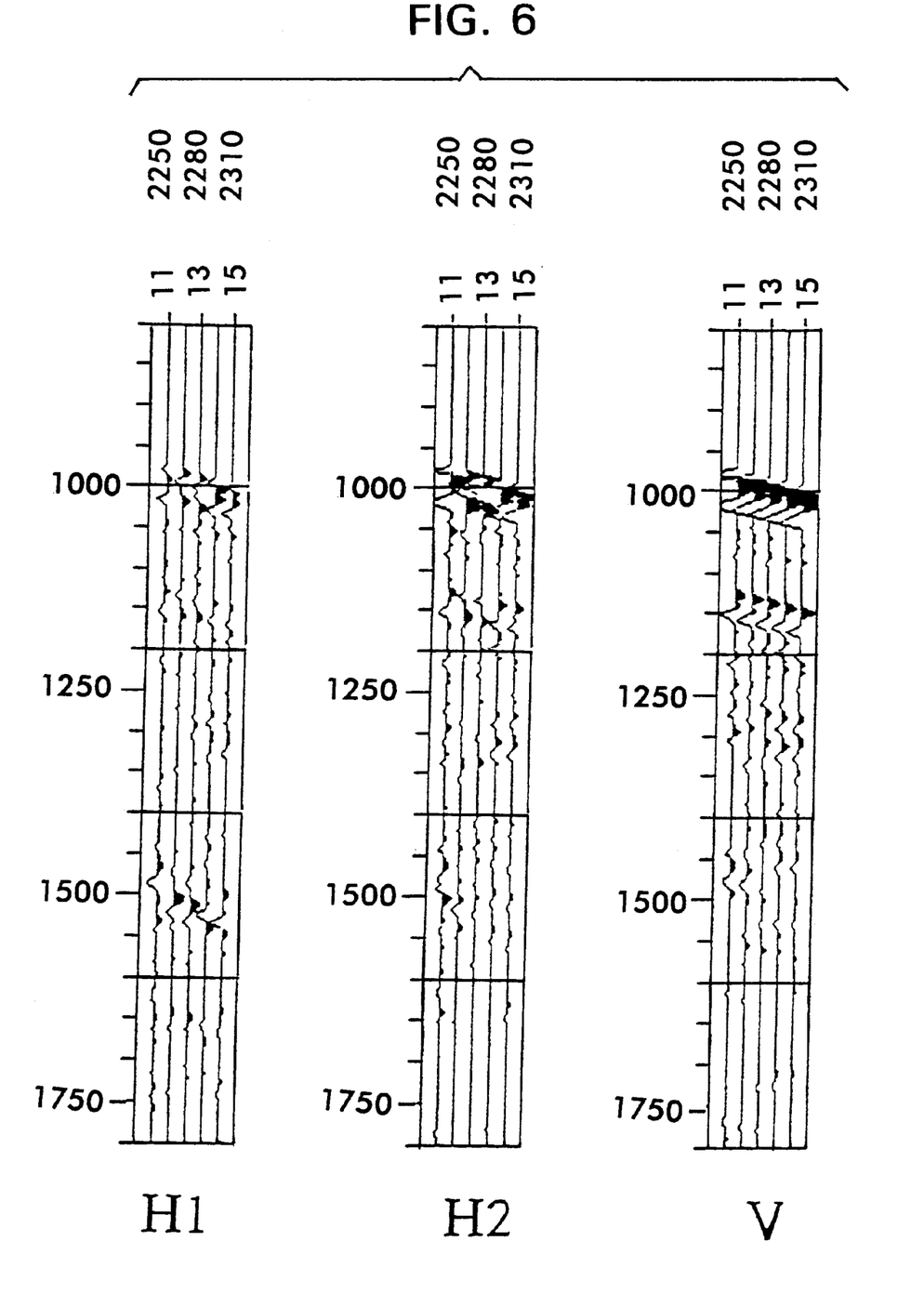

The axis N is perpendicular to the axis R and is located in the plane V, $H_{max}$, and the axis T is perpendicular to the plane R, N (FIG. 5).

The conversion from the system of axes V, $H_1$, $H_2$ to the system of axes R, N, T is carried out by a rotation through an angle $\Phi_H$ about the axis V, and another rotation through an angle $\Phi_V$ about a vector $H_{min}$ which is perpendicular to the vector $H_{max}$. The angles $\Phi_H$ and $\Phi_V$ are calculated on the basis of the three components V, $H_1$, $H_2$ present in a time window located around the direct arrival. The angles $\Phi_H$ and $\Phi_V$ can be calculated by using, for example, the SEISLINK software (1996 version) marketed by the company WESTERN.

For each source/receiver pair, the initial data V, $H_1$, $H_2$ delivered by the sensors are projected into the second system of axes R, N, T. The components along the axes R, N, T are expressed using the following equations:

$$R = V \cos \Phi_H + (H_1 \cos \Phi_H + H_2 \sin \Phi_H) \sin \Phi_V$$

$$N = -V \cos \Phi_V$$

$$T = -H_1 \sin \Phi_H + H_2 \cos \Phi_H$$

The angle $\delta$ is calculated for each reception position, using an inversion procedure which uses the angles $\Phi_H$, the positions of the source relative to the receiver, the deviation Ψ and the azimuth θ of the borehole. The value of the angle δ is calculated by minimizing the following function:

$$F = \sum_{sources} \sin\phi\cos(\delta + \phi_H)\sin(\theta - \alpha) +$$

$$\sin(\delta + \phi_H)[\cos(\theta - \alpha)\sin\phi\cos\psi - \cos\phi\sin\psi]$$

in which α represents the angle formed by the plane containing the source/receiver pair and the axis X.

Figure 7:
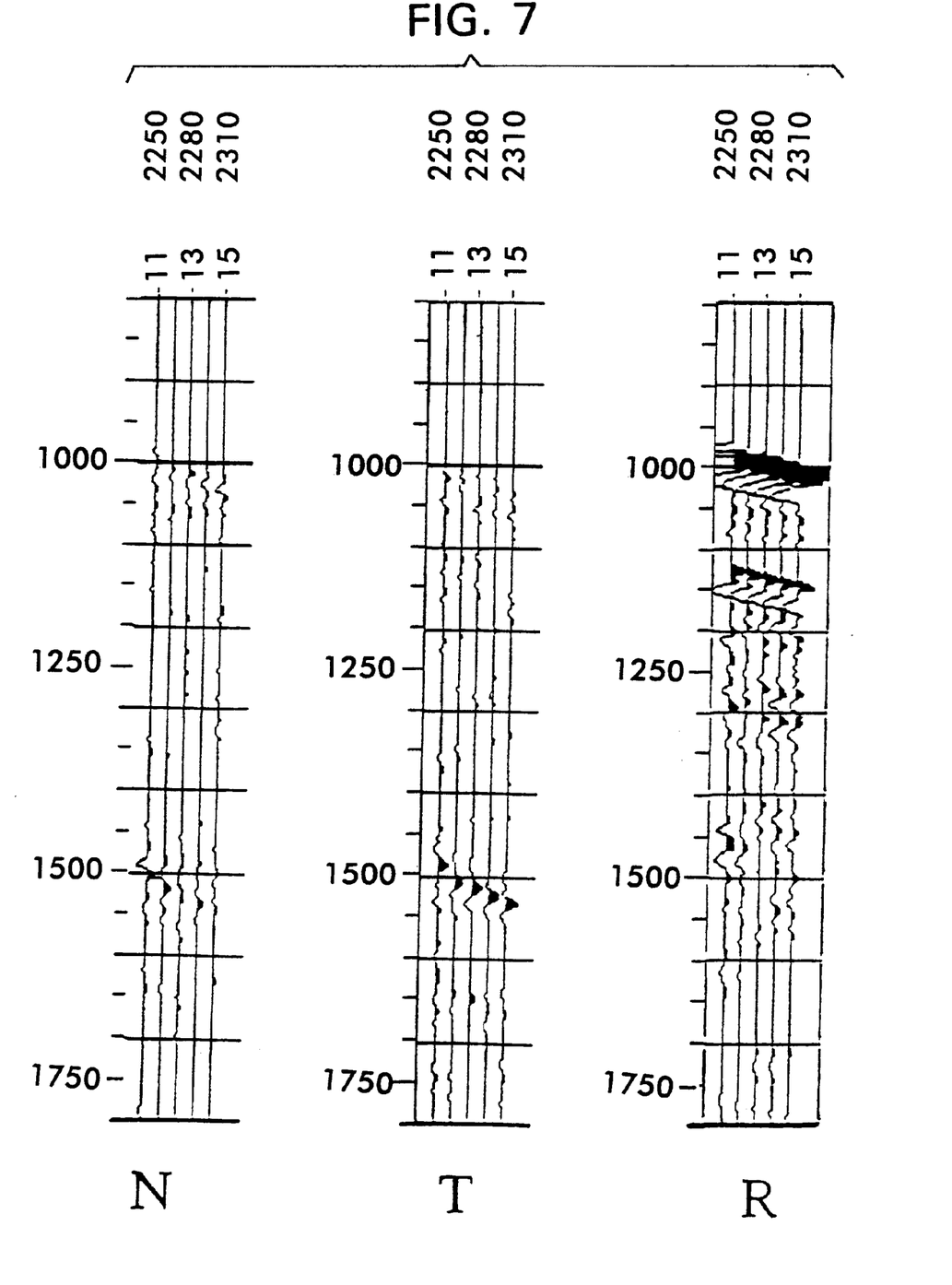
FIG. 7 is a schematic representation of the collections of traces along the axes R, N, T.

In another step, and after common-source collections of the components of the traces of the axes R, N, T have been formed (FIG. 7), each common-source collection of R traces is processed in order to extract the downgoing P-wave field.

Figure 8:
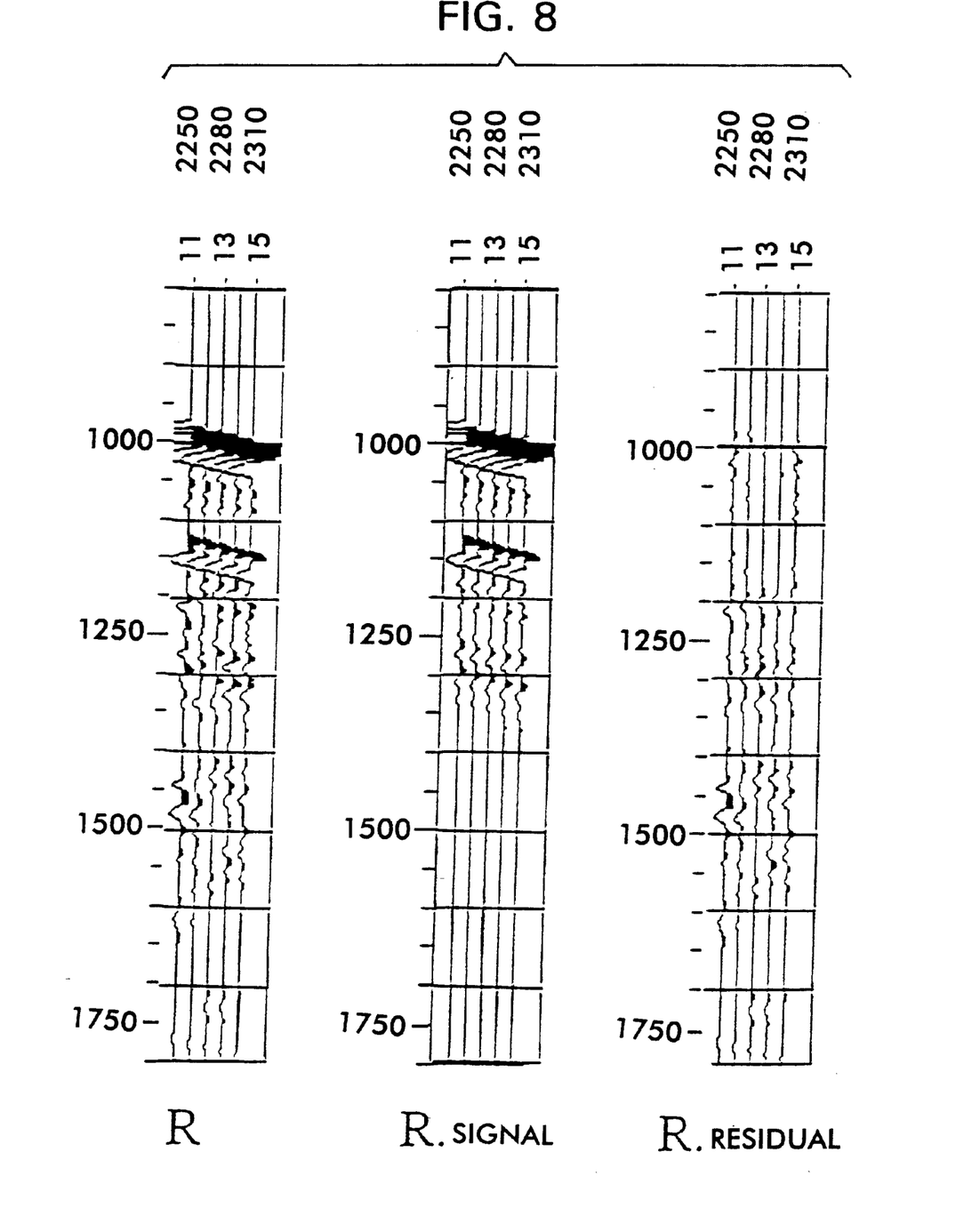
FIG. 8 is a schematic representation of the R, R signal and residual R trace collections.

For this operation, carried out independently for each common-source collection of R traces, the matrix filtering technique is used (CEPHAG-IFP). After the data have been horizontalized by picking the first arrival, this technique is applied either to the entire available time range or to only a portion (it is in this way possible to avoid involving another high-amplitude downgoing event which would distort the estimate—for example a downgoing S-wave). The technique is based on a decomposition of the cross-spectral matrices after frequency and/or spatial averaging: the filtering parameters are chosen so as to make it possible to extract the downgoing P field under optimum conditions. The frequency averaging is carried out so as to keep only the first terms of the cross-correlation functions, with no spatial averaging being performed. For each initial R collection, the present invention consists in delivering, as output, a common-source collection referred to as R signal, these signals constituting the estimate of the downgoing P field for the source position in question. A residual-R common-source collection is obtained by taking the difference between the R initial collection and the R signal estimate (FIG. 8).

The R signal collections thus estimated can be used subsequently to calculate antimultiple operators.

Figure 9:
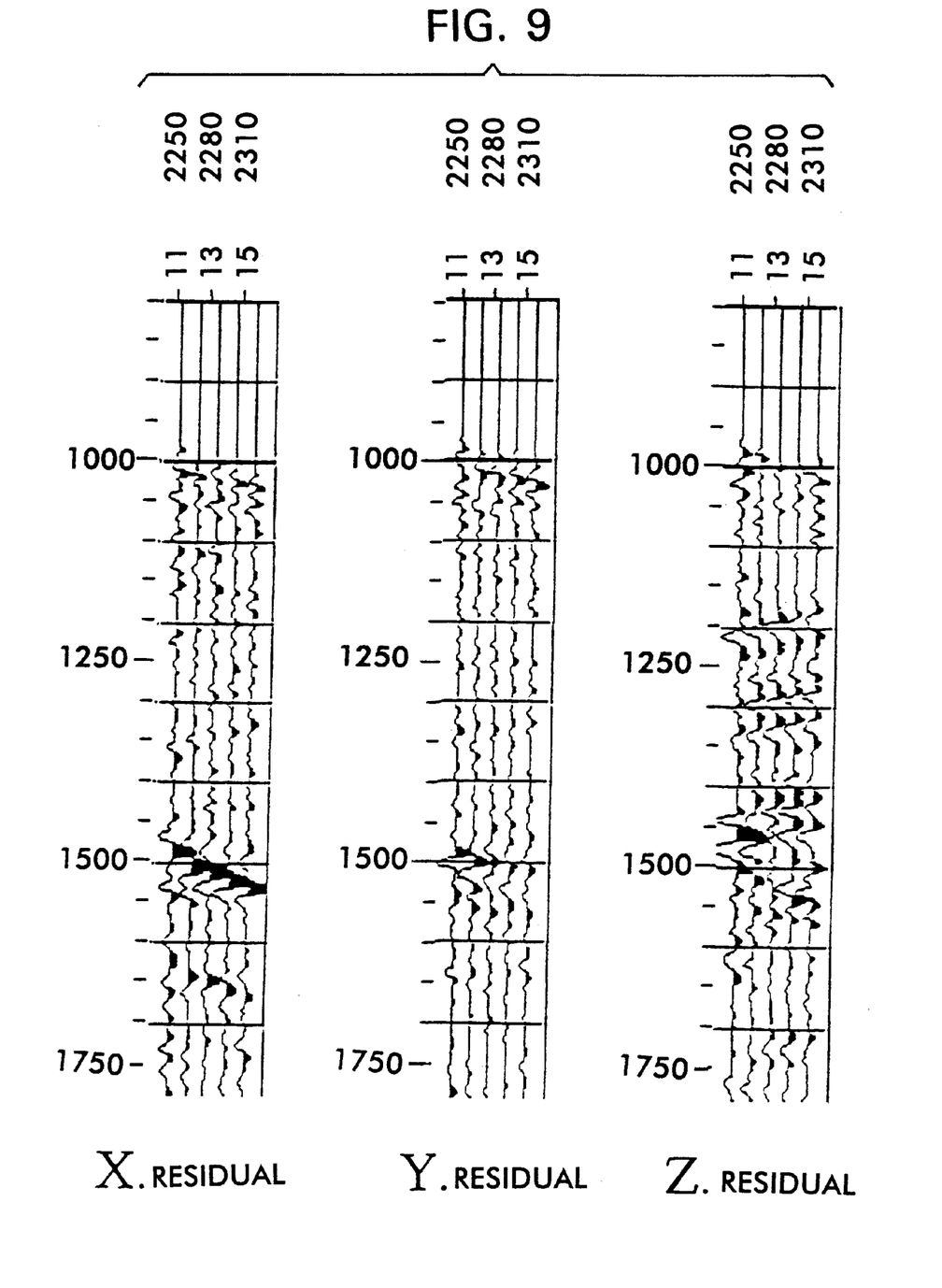
FIG. 9 is a schematic representation of the projections of the residual-R and N, T trace collections on the geographically fixed axes X, Y, Z.

The residual-R and N, T components are projected into the fixed frame X, Y, Z by using the angles $\Phi_H$, $\Phi_V$ and δ, as well as the deviation Ψ and the azimuth θ of the borehole. The components obtained in this way are termed residual X, residual Y and residual Z (FIG. 9).

For each common-source trace collection, on the one hand, and each residual X, residual Y and residual Z component, on the other hand, a decomposition is performed in a domain (τ, p) by using an inversion technique. FIG. 10 schematically represents a common-source collection of residual traces. In this collection of residual traces, a pivot trace 10 located at a depth z is selected. A straight line 11 of variable slope p is plotted with each sample t in the pivot trace. Along said straight line 11, for each value p, the amplitudes of the seismic events 12 located at the intersections of the process 10 and 13 to 16 with said straight line 11 are summed. The amplitude sums A for the corresponding times and slopes are transferred into the domain (τ, p), in which p represents the values of the slope and τ the time corresponding to t.

On the basis of the data of each of the residual X, residual Y, residual Z in the domain (τ, p), a synthetic seismogram is made which is compared with the corresponding residual X, residual Y or residual Z collection, and iterations are performed until the synthetic seismogram is acceptable in terms of the data of the corresponding residual X, residual Y or residual Z collection.

Figure 11:
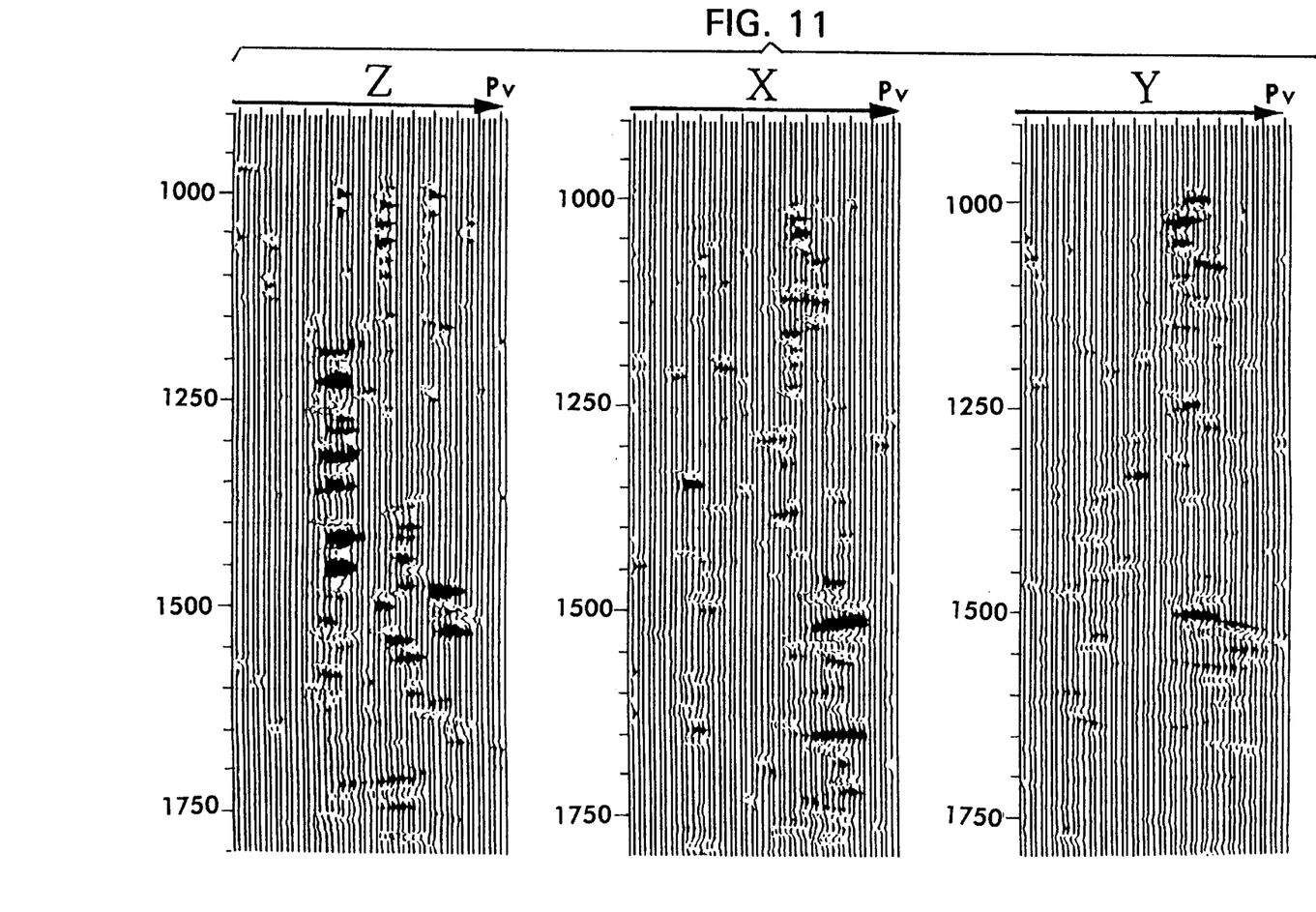
FIG. 11 is a schematic representation of the decomposition in the domain (τ, p) of the X, Y, Z trace collections of FIG. 9, FIG. 12 schematically represents, in the system of axes X, Y, Z, the synthesis of the pivot trace of FIG. 10, representing the estimate of the upgoing P-wave field.

In order to avoid spreading of the events in the domain (τ, p), regularization to a norm $L_1$ is applied in the inversion procedure. FIG. 11 represents the decomposition in the domain (τ, p) of the residual X, residual Y and residual Z trace collections of FIG. 9. On the basis of the decomposition in the domain (τ, p) of the residual X, residual Y and residual Z components, the polarization attribute ζ and the azimuth attribute γ are calculated for each value of p and τ, this being done over a moving window, using the eigenelements of the variance and covariance matrix included in the aforementioned SEISLINK software. These attributes ζ or polar (τ, p) and γ or azi (τ, p) are used to calculate the attribute $V_p$ (velocity of the P-wave in the medium in question) using the following formula:

$$V_p(\tau, p) = \frac{(\cos[polar(\tau, p)]\cos\psi + \sin[polar(\tau, p)]\sin\psi\cos[azi(\tau, p) - \theta])}{p}$$

The raypath parameter $p_z$ (τ, p), relative to the axis Z, of the event in question can also be evaluated by the formula:

$$p_z(\tau, p) = \frac{\cos[polar(\tau, p)]}{V_p(\tau, p)}$$

Since the axis Z is vertical, the parameter $P_z$ (τ, p) is used to discriminate the upgoing events from the downgoing events.

Knowledge of the attributes $V_p$ (τ, p) and $p_z$ (τ, p) makes it possible to define a selection (mute) of the events to be kept in the domain (τ, p). It may be worthwhile during this to use whatever knowledge may be available of the geological velocity $V_p$ of the medium in which the reception device is positioned.

Figure 12:
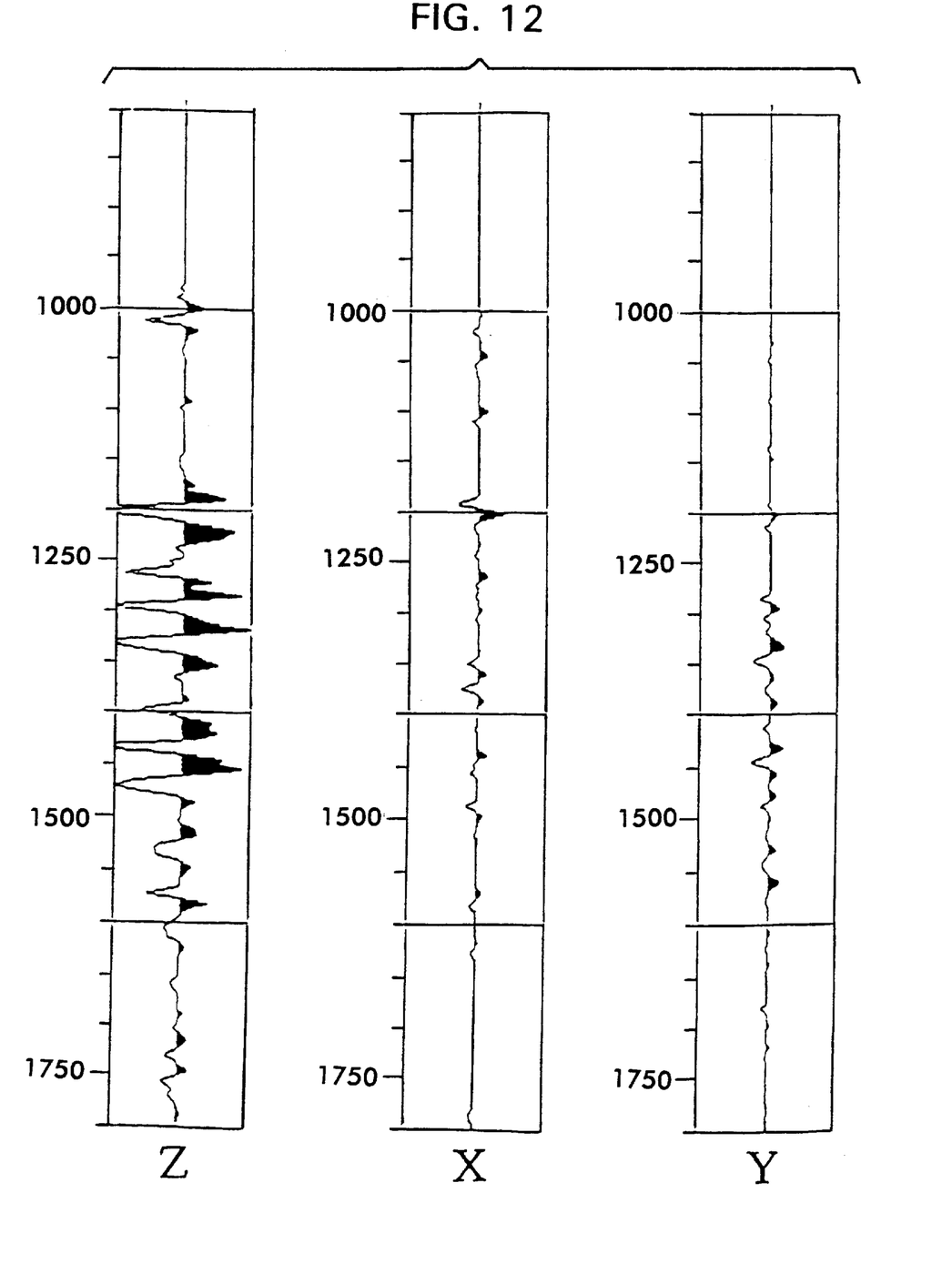

A mute (selection) may, for example be applied in the domain (τ, p) by using the various attributes described above, so as to keep only the upgoing P events. These events are then synthesized to construct a seismogram in the domain (X, Y, Z, t) representing the upgoing P-wave field. FIG. 12 represents the estimate of the components X, Y and Z of the upgoing P-wave field corresponding to the pivot trace 10 to which the decomposition in the domain (τ, p) was applied.

Identical processing may be carried out in order to extract the downgoing and upgoing S-wave fields.

In the case when the axis 7 of the borehole 4 is vertical (Ψ=0), the value θ is arbitrarily fixed at the value zero.

The method according to the invention is more flexible than the prior art methods of optimum filtering or parametric inversion. It requires no picking other than that of the first arrival, and it is not necessary to define the number of waves to be extracted; further, it is not necessary to determine the apparent velocities.

The method according to the invention is consequently very simple to use and can be employed as is for 3D acquisitions. Further, it provides an opportunity to analyze the data and check the result of the separation.

Of course, it is possible to carry out the decomposition (τ, p) of the data represented in the system of axes R, N, T. It is also possible to calculate the polarization attribute ζ and the azimuth attribute γ relative to this frame R, N, T, as well as the attribute $V_p$ in the domain (τ, p).

The R, N, T trace collections may be replaced by the C collections obtained from the components V, $H_1$, $H_2$, the other steps of the method according to the invention being carried out on said C collections so as to obtain the collections of residual C traces needed for decomposition in the domain (τ, p).

Similarly, the collections of residual C traces and their associated trace collections may be projected into the system of axes (X, Y, Z) in order to obtain the residual X, residual Y and residual Z trace collections which are then subjected to the decomposition in the domain ($\tau$, p).

The present invention may be applied for high-resolution imaging of reservoirs as well as for the calibration of AVO measurements (measurements of the reflection coefficient versus angle of incidence). To be precise, on the basis of walkaway data, it is possible to measure the incident and reflected fields and, by deconvolution, to make a plausible estimate of the reflection coefficient, this measurement being commensurately more exact if the sensor is close to the target studied. In addition, polarization analysis leads to knowledge of the angles of incidence. All the required elements are therefore available for directly evaluating the behavior of the reflection coefficient with respect to the angle of incidence.

Finally, the present invention can be used to measure the anisotropy in the line of the reception device, it being possible to obtain said anisotropy by joint analysis of the apparent velocity and the polarization of the direct arrival.

I claim:

1. A method for separating waves propagating in a medium, said method comprising:

generating waves in the medium successively from several positions of at least one source which are located at the surface of said medium, receiving said waves at at least one receiver that can successively occupy at least two positions in a borehole drilled in the medium, each receiver comprising three sensors which are oriented in a first system of axes (V, $H_1$, $H_2$), one of said axes (V) being oriented in a specified direction, each sensor delivering a signal which is recorded as a function of time in the form of a trace which is identified by the positions of a source/receiver pair that produced said trace, forming collections of traces (C) from a common source (z, t) said method further comprising, a) extracting first C signal arrivals of at least one of the C trace collections, b) generating, on the basis of said at least one C trace collection, initial data comprising a collection of residual C traces in which each residual trace is a difference between the C trace and a C signal estimate, c) selecting, from the collection of residual C traces, a pivot trace located at a focus depth z, d) plotting a straight line of variable slope p at each sampled point of the pivot trace, e) forming, along said straight line, for each value of p, amplitude sums by summing amplitudes of seismic events located at intersections of the traces with said straight line, f) transferring the amplitude sums for the corresponding time and slope into data in a domain ($\tau$, p) in which p represents values of said slope and $\tau$ represents time, g) making a synthetic seismogram on the basis of the data in said domain ($\tau$, p), h) comparing the synthetic seismogram with the common source collection of residual C traces, and i) performing iterations of the extracting to comparing steps until the synthetic seismogram is acceptable in terms of the initial data of said common source collection of residual C traces.

2. The method as claimed in claim 1, which further comprises:

for each position of a source/receiver pair, defining a second system of axes (R, N, T) which is calculated from components on the first system of axes V, $H_1$, H2, from a displacement vector corresponding to a first arrival of a wave of interest and from a projection $H_{max}$ of said displacement vector into a plane $H_1$, $H_2$, the axis R being located in a plane V, $H_{max}$, the axis N being perpendicular to the axis R and located in a plane V, $H_{max}$ and the axis T being perpendicular to a plane R, N, producing R traces, N traces and T traces in the system of axes R, N, T by projecting components of the traces identified along the axes V, $H_1$, $H_2$, forming the collections of traces (C) from a common source (z, t) from at least the R traces, extracting first R signal arrivals of the collections of traces from the R traces, on the basis of the collection of traces from the R traces, making a collection of residual R traces in which each residual R trace is a difference between the R trace and an R signal estimate, from the collection of residual R traces, selecting a pivot trace located at a depth z, performing steps d) to i) on the residual R traces.

3. The method as claimed in claim 2, which further comprises:

defining a geographically fixed third system of axes (X, Y, Z), in the third system of axes (X, Y, Z), determining a deviation $\Psi$ and azimuth $\theta$ of the borehole, aligning the axis V of the first system of axes (V, $H_1$, $H_2$) with the direction of the borehole, defining a vector $h_1$ which is perpendicular to the axes V and Z and is contained in the plane $H_1$, $H_2$, determining an angle $\delta$ between the vector $h_1$ and the axis $H_1$.

4. The method as claimed in claim 3, which further comprises projecting into the third fixed system of axes (X, Y, Z) a residual component (C or R) and associated components $H_1$ and $H_2$ or N and T to form residual components $X_r$ and $Y_r$, $Z_r$ on the axes X, Y, Z, so that a decomposition in the domain ($\tau$, p) is carried out on the basis of the residual components $X_r$ and $Y_r$, $Z_r$.

5. The method as claimed in claim 4, which further comprises calculating, for each source/receiver pair and in the domain ($\tau$, p), a polarization angular attribute $\zeta$, and an azimuth angular attribute $\mu$.

6. The method as claimed in claim 5, wherein the wave of interest is a p-wave, and the polarization attribute $\zeta$, an azimuth attribute $\gamma$, an angle of deviation $\psi$ and the azimuth $\theta$ of the borehole, as well as the slope p, are used to calculate a velocity attribute ($V_p$) of the P-waves in the medium.

7. The method as claimed in claim 6, wherein a raypath parameter $p_z$ relative to the axis Z of a seismic event corresponding to values $\tau$ and p is calculated in the domain ($\tau$, p) from the polarization attribute $\zeta$ and the $V_p$ attribute.

8. The method as claimed in claim 7, wherein the attributes $p_z$ and $V_p$ are used to make a selection (mute) of events to be kept in the domain ($\tau$, p).

9. The method as claimed in claim 8, wherein the events that are kept in the domain ($\tau$, p) are those connected with upgoing P-waves.

10. The method as claimed in claim 1, wherein a synthetic section representing an upgoing P-wave field is constructed from events that are kept in the domain ($\tau$, p).

11. The method as claimed in claim 1, wherein a wave of interest is an S-wave.

12. The method as claimed in claim 3, wherein, when the axis of the borehole is vertical, the azimuth of said borehole is fixed at a zero value.

* * * * *